United States Patent
Huang et al.

(10) Patent No.: US 11,973,679 B2
(45) Date of Patent: Apr. 30, 2024

(54) ENHANCED FRAME EXCHANGE AND MULTI-LINK DEVICE MESSAGING FOR SECURE COMMUNICATIONS

(71) Applicant: Intel Corporation, Santa Clara, CA (US)

(72) Inventors: Po-Kai Huang, San Jose, CA (US); Robert Stacey, Portland, OR (US); Daniel Bravo, Portland, OR (US); Ido Ouzieli, Tel Aviv (IL); Danny Alexander, Neve Efraim Monoson (IL); Ofer Hareuveni, Haifa (IL)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 17/392,923

(22) Filed: Aug. 3, 2021

(65) Prior Publication Data
US 2021/0367872 A1 Nov. 25, 2021

Related U.S. Application Data

(60) Provisional application No. 63/060,449, filed on Aug. 3, 2020.

(51) Int. Cl.
*H04L 43/12* (2022.01)
*H04W 88/08* (2009.01)

(52) U.S. Cl.
CPC ............ *H04L 43/12* (2013.01); *H04W 88/08* (2013.01)

(58) Field of Classification Search
CPC .................................. H04L 43/12; H04W 88/08
See application file for complete search history.

(56) References Cited

U.S. PATENT DOCUMENTS

| | | | | |
|---|---|---|---|---|
| 6,965,646 | B1* | 11/2005 | Firestone | H04N 21/6437 375/E7.277 |
| 2015/0215867 | A1* | 7/2015 | Choi | H04W 52/0216 370/311 |
| 2016/0014689 | A1* | 1/2016 | Malinen | H04W 12/086 455/434 |
| 2019/0306702 | A1* | 10/2019 | Yoon | H04W 12/06 |
| 2021/0195500 | A1* | 6/2021 | Choi | H04W 12/06 |
| 2022/0167256 | A1* | 5/2022 | Kneckt | H04W 12/037 |
| 2022/0173773 | A1* | 6/2022 | Lou | H04B 7/0619 |
| 2022/0286844 | A1* | 9/2022 | Mccann | H04W 8/005 |
| 2022/0386109 | A1* | 12/2022 | Mccann | H04W 8/26 |

(Continued)

OTHER PUBLICATIONS

IEEE P802.11, Wireless LANs MAC Address Change Scrambler Reset, Jan. 2019 (Year: 2019).*

*Primary Examiner* — Christopher M Crutchfield
*Assistant Examiner* — Tito Q Pham
(74) *Attorney, Agent, or Firm* — Eversheds Sutherland (US) LLP

(57) ABSTRACT

This disclosure describes systems, methods, and devices related to enhanced frame exchange. A device may generate a first subset of a plurality of fields, wherein the first subset is mandatory in a probe request frame. The device may generate a second subset of the plurality of fields, wherein the second subset is optional in the probe request frame regardless of capability information of the device. The device may generate the probe request frame comprising the first subset and the second subset. The device may cause to send the probe request frame to an access point (AP) device.

18 Claims, 12 Drawing Sheets

(56) References Cited

U.S. PATENT DOCUMENTS

| | | | |
|---|---|---|---|
| 2023/0232276 A1* | 7/2023 | Chitrakar | H04W 72/0446 370/230 |
| 2023/0379801 A1* | 11/2023 | Siraj | H04W 48/10 |

* cited by examiner

Table 1: Probe Request frame body

| Order | Information | Notes |
|---|---|---|
| 1 | SSID | If dot11MeshActivated is true, the SSID element is the wildcard value as described in 9.4.2.2. |
| 2 | Supported Rates and BSS Membership Selectors | This field is not present if dot11DMGOptionImplemented is true. |
| 3 | Request | The Request element is optionally present if dot11RadioMeasurementActivated is true.<br><br>The Request element is optionally present if dot11MultiDomainCapabilityActivated is true or if dot11EstimatedServiceParametersInboundOptionImplemented is true. |
| 4 | Extended Supported Rates and BSS Membership Selectors | The Extended Supported Rates and BSS Membership Selectors element is present if there are more than eight supported rates and is optionally present otherwise. This element is not present if dot11DMGOptionImplemented is true. |
| 5 | DSSS Parameter Set | The element is optionally present.<br><br>The DSSS Parameter Set element is present within Probe Request frames generated by STAs using Clause 15, Clause 16, or Clause 18 PHYs if dot11RadioMeasurementActivated is true. The DSSS Parameter Set element is present within Probe Request frames generated by STAs using a Clause 19 PHY in the 2.4 GHz band if dot11RadioMeasurementActivated is true.<br><br>The DSSS Parameter Set element is optionally present within Probe Request frames generated by STAs using Clause 15, Clause 16, or Clause 18 PHYs if dot11RadioMeasurementActivated is false.<br>The DSSS Parameter Set element is optionally present within Probe Request frames generated by STAs using a Clause 19 PHY in the 2.4 GHz band if dot11RadioMeasurementActivated is false. |
| 6 | Supported Operating Classes | The Supported Operating Classes element is present if dot11ExtendedChannelSwitchActivated or dot11OperatingClassesRequired is true.<br>The Supported Operating Classes element is optionally present if dot11TVHTOptionImplemented is true. |
| 7 | HT Capabilities | The HT Capabilities element is present when dot11HighThroughputOptionImplemented is true. |
| 8 | 20/40 BSS Coexistence | The 20/40 BSS Coexistence element is optionally present when dot1120/40BSSCoexistenceManagementSupport is true. |
| 9 | Extended Capabilities | The Extended Capabilities element is present if any of the fields in this element are nonzero. |
| 10 | SSID List | The SSID List element is optionally present if dot11SSIDListActivated is true. |
| 11 | Channel Usage | The Channel Usage element is optionally present if dot11ChannelUsageActivated is true. |

FIG. 4

Table 1: Probe Request frame body (Continued)

| Order | Information | Notes |
|---|---|---|
| 12 | Interworking | The Interworking element is present if dot11InterworkingServiceActivated is true. |
| 13 | Mesh ID | The Mesh ID element is present if dot11MeshActivated is true. |
| 14 | Multi-band | The Multi-band element is optionally present if dot11MultibandImplemented is true. |
| 15 | DMG Capabilities | The DMG Capabilities element is present if dot11DMGOptionImplemented is true. |
| 16 | Multiple MAC Sublayers | The Multiple MAC Sublayers element is present if dot11MultipleMACActivated is true. |
| 17 | VHT Capabilities | The VHT Capabilities element is present when dot11VHTOptionImplemented is true. |
| 18 | Estimated Service Parameters Inbound | The Estimated Service Parameters Inbound element is optionally present if dot11EstimatedServiceParametersInboundOptionImplemented is true. |
| 19 | Extended Request | The Extended Request element is optionally present if dot11RadioMeasurementActivated is true. |
| 20 | FILS Request Parameters | The FILS Request Parameters element is optionally present if dot11FILSActivated is true; otherwise not present. |
| 21 | AP-CSN | The AP-CSN element is optionally present if dot11FILSActivated is true; otherwise not present. |
| 22 | Change Sequence | The Change Sequence element is optionally present if dot11S1GOptionImplemented is true; otherwise not present. |
| 23 | S1G Relay Discovery | The S1G Relay Discovery element is optionally present if dot11RelayDiscoveryOptionImplemented is true; otherwise not present. |
| 24 | PV1 Probe Response Option | The PV1 Probe Response Option element is optionally present if dot11PV1ProbeResponseOptionImplemented is true; otherwise not present. |
| 25 | S1G Capabilities | The S1G Capabilities element is present if dot11S1GOptionImplemented is true; otherwise not present. |
| 26 | EL Operation | The EL Operation element is present if dot11S1GELOperationActivated is true. |
| 27 | MAD | The MAD element is optionally present if dot11S1GOptionImplemented is true; otherwise not present. |
| 28 | Vendor Specific Request | The Vendor Specific Request element is optionally present. |
| 29 | CDMG Capabilities | The CDMG Capabilities element is present if dot11CDMGOptionImplemented is true; otherwise not present. |
| 30 | Cluster Probe | The Cluster Probe element is optionally present if dot11ClusteringActivated is true; otherwise not present. |
| 31 | CMMG Capabilities | The CMMG Capabilities element is present when dot11CMMGOptionImplemented is true; otherwise not present. |

FIG. 5

ENHANCED FRAME EXCHANGE AND MULTI-LINK DEVICE MESSAGING FOR SECURE COMMUNICATIONS

CROSS-REFERENCE TO RELATED APPLICATION(S)

This application claims the benefit of U.S. Provisional Application No. 63/060,449, filed Aug. 3, 2020, the disclosure of which is incorporated herein by reference as if set forth in full.

TECHNICAL FIELD

This disclosure generally relates to systems and methods for wireless communications and, more particularly, to enhanced frame exchange and multi-link device messaging for secure communications.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIGS. 4 and 5 depict a Table of elements included in a probe request frame.

DETAILED DESCRIPTION

Figure 1:
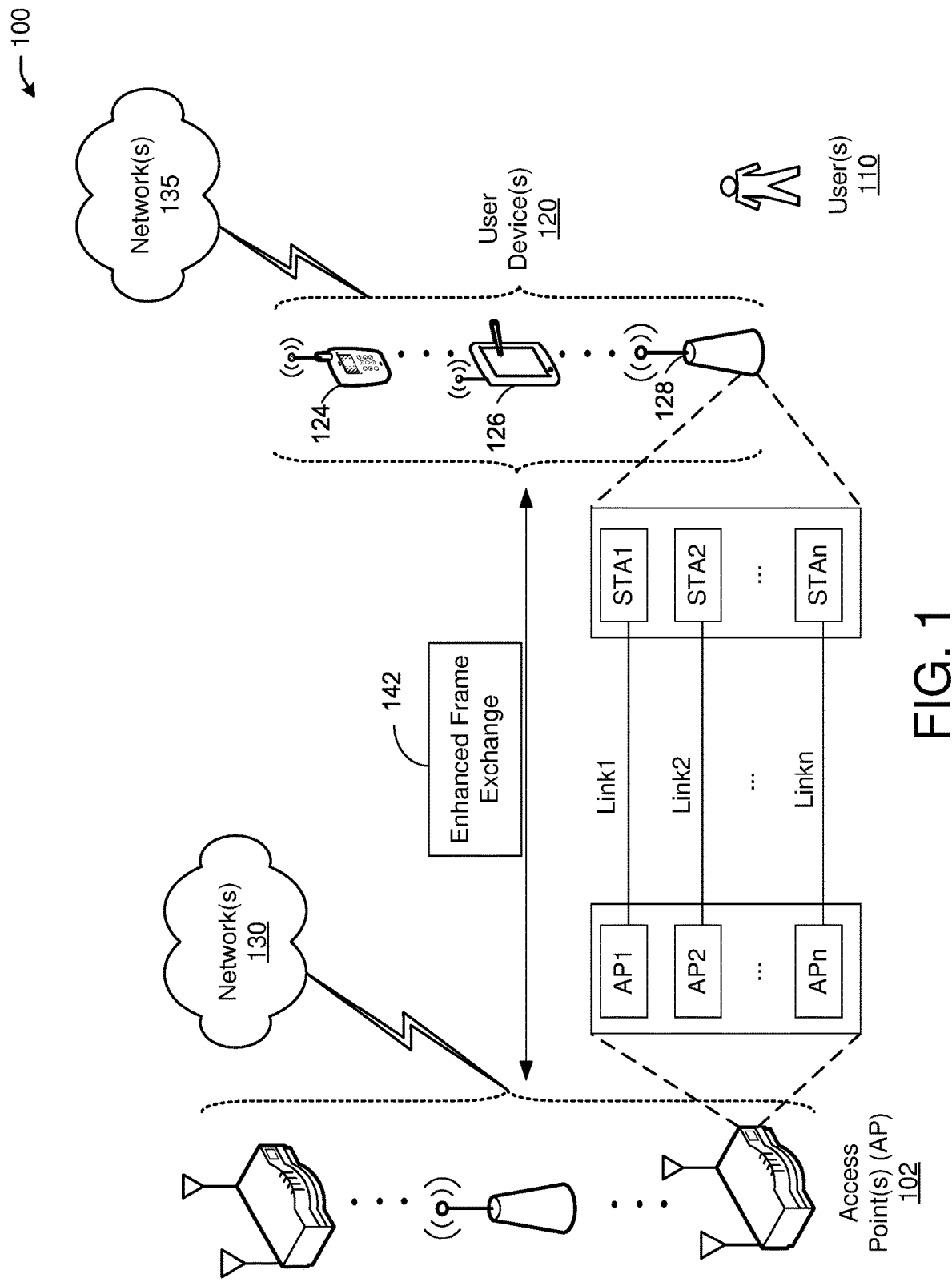
FIG. 1 is a network diagram illustrating an example network environment for enhanced frame exchange, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

It is known that the medium access control (MAC) address used for sending probe request frame is a reliable source for tracking specific devices. Once tracking is allowed, the collected information may then be used to correlate with a specific person and reveal private and sensitive information, which then violates the privacy goal. When a non-AP STA searches for and connects to, an infrastructure basic service set (BSS), independent basic service set (IBSS), or personal basic service set (PBSS) or attempts to discover services on a network pre-association, it defines the addressing of its MAC layer for the particular connection. If the STA uses a fixed MAC address it is trivial to track the STA. The dynamic nature of BSS membership combined with this tracking information allows for the construction of a network of connections, locations, and behavior. This network can be used to glean private and sensitive information regarding the individual behind the device.

The current 802.11 standard solves this problem through the following mechanism:
  Randomize MAC address while not associated to a BSS.
  Whenever a MAC address is changed, sequence number space is also randomized.
  Whenever a MAC address is changed, scrambler seed is also reset.

MAC privacy enhancements are enabled on a non-AP STA when dot11MACPrivacyActivated is set to true. The STA shall periodically change its MAC address to a random value while not associated with a BSS. The STA shall construct the randomized MAC address from the locally administered address space as defined in IEEE Std 802®-2014 and IEEE Std 802c™-2017.

Every time a MAC address is changed to a new random value, counters in all sequence number spaces used to identify each MAC service data unit (MSDU) or MAC management protocol data unit (MMPDU) shall be reset and the STA shall set the TXVECTOR parameter SCRAMBLER_RESET to RESET_SCRAMBLER on the next transmitted PPDU. The TXVECTOR is used to send and receive information between the MAC layer and the PHY layer.

Simply randomizing MAC address is generally not enough. Specifically, by doing element fingerprint it is possible to still classify certain connections and eventually use the classification to track a specific device. For example, a hacker could utilize a number of elements to uniquely identify the probe request frame.

The element fingerprint works and can be used by an attacker because by combining a series of elements/fields revealed in the probe request frame, which has a high probability to be unique for each device, tracking a device becomes possible regardless of the MAC address used in the frame header. There is no previous solution to deal with the technique of element fingerprint.

Although various mechanisms have been introduced to the 802.11 standard to preserve privacy and randomize MAC address, whenever there is a specific state created that is bound to MAC addresses, the non-AP STA have to revert back to that specific MAC address and cannot randomize a new MAC address as shown below.

"State created with an AP using a prior MAC address, for instance, robust security network (RSN) preauthentication state or FT state established over-the-DS, is bound to the MAC address used when that state was created. Prior to establishing an association to the AP, the non-AP STA shall change its MAC address to the MAC address used when the state was created."

For example, a non-AP STA may pre-authenticate with an AP using simultaneous authentication of equals (SAE) procedure to generate pairwise master key (PMK) and reassociate later with the AP. While reassociating with the AP, the STA then cannot randomize MAC address unless preauthentication method is done again, which then increases the time of roaming. Except that the 802.11 standard defined behavior for the previous existing state, there are also MAC address filtering implemented in the current router, which only accepts connection from certain MAC address and forces the non-AP STA to always use the same MAC address while connecting to the AP with MAC address filtering feature. After association with an AP, since the state is bounded, there is also no way to randomize MAC address. As a result, tracking is then possible after a non-AP STA connects to an AP and roams in an ESS, which is all the APs with the same SSID. The non-AP STA connecting to an infrastructure BSS shall retain a single MAC address for the duration of its connection across an ESS. A pairwise master key security association (PMKSA) created as part of a robust security network association (RSNA) will contain the MAC address used to create the PMKSA. The non-AP STA that supports PMKSA caching shall, if necessary, change its MAC address back to that value when attempting a subsequent association to the ESS using PMKSA caching.

There is no previous solution to enable Wi-Fi Privacy while establishing a connection and after establishing the connection.

Example embodiments of the present disclosure relate to systems, methods, and devices for an enhanced frame exchange frame to avoid element fingerprint.

In one embodiment, an enhanced frame exchange system may allow elements that are required to be in probe request frame today based on the supported capability to become optionally present independent of supported capabilities. That is, without imposing any conditions on whether an element should be added or not. A device may add or not add an element depending on implementation without making the elements in the probe request frame to be mandatory or included when a condition is met.

Once all the elements of a probe request are not required to be in the probe request frame independent of supported capabilities, the element fingerprint technique is not useful anymore because a device can now transmit as few elements as possible to reduce the element fingerprint. An attacker with only a few elements to track is now harder to link different transmissions based on included elements.

In one embodiment, a multi-link device (MLD) privacy system may utilize the two address architecture of MLD so that MLD can randomize station device (STA) medium access control (MAC) address:

- MLD address is not randomized so that key generation, block acknowledgment (BA) negotiation, distribution system (DS) mapping is not changed while STA MAC address is randomized.
- MAC address of the STA can be changed in a secure way after a connection is established. The change pattern can be agreed upon through a request/response exchange. The change pattern can be agreed upon beforehand based on a fixed pattern across time. Other fields like association identification (AID), sequence number (SN), pseudorandom number (PN), scrambler seed will then also be changed accordingly to make tracking while establishing a connection or after establishing a connection much harder.
- Specific time can be defined for both sides to understand when to start to use the new STA MAC address and other parameters.

The two address framework of MLD to decouple STA address used for frame exchange on the air and the address for connection enables the possibility to randomize STA MAC address and corresponding fields and enhances Wi-Fi privacy while establishing a connection and after establishing the connection. As a result, MLD can achieve privacy goals.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of an enhanced frame exchange, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 7:
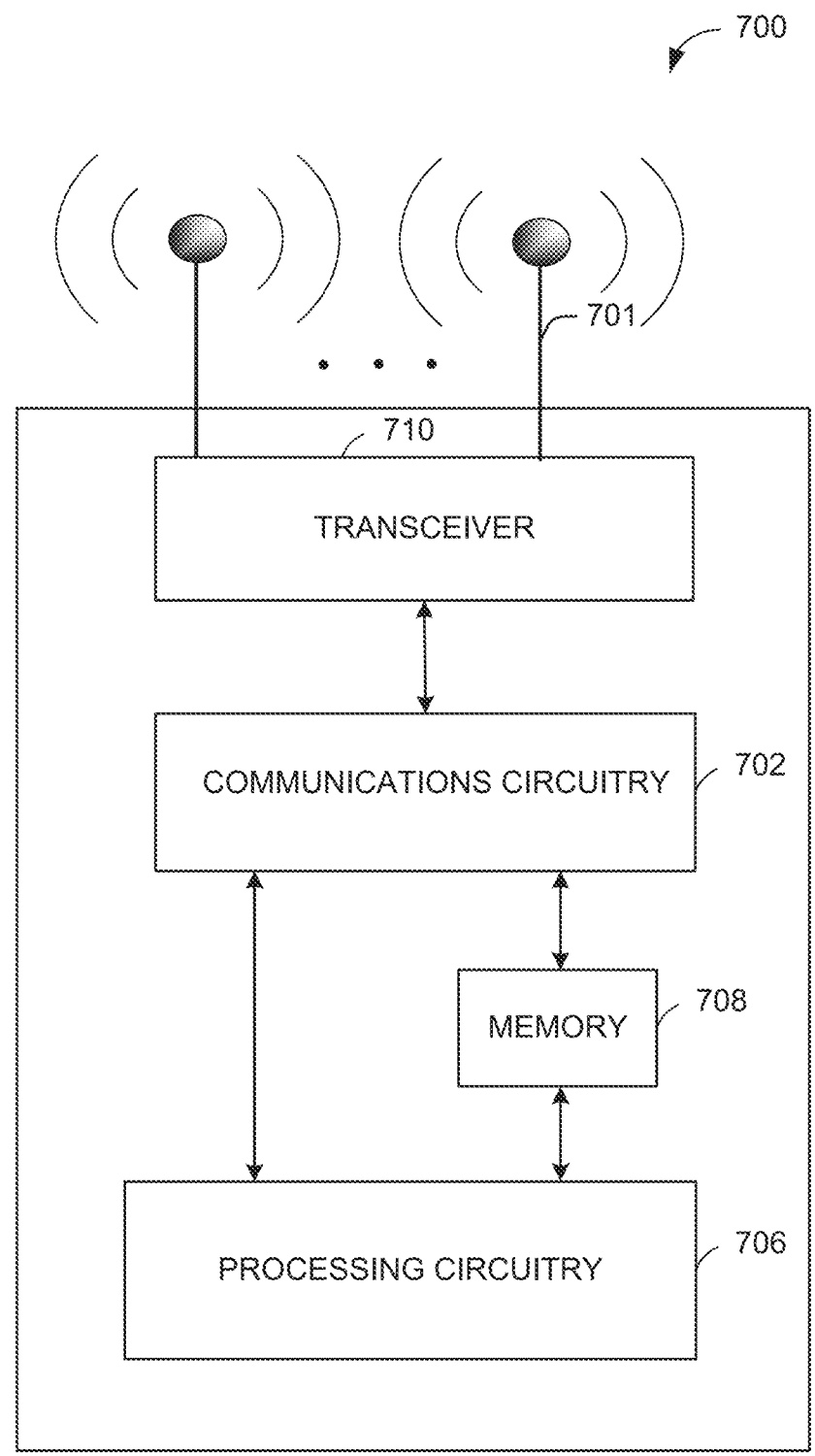
FIG. 7 illustrates a functional diagram of an exemplary communication station that may be suitable for use as a user device, in accordance with one or more example embodiments of the present disclosure.
Figure 8:
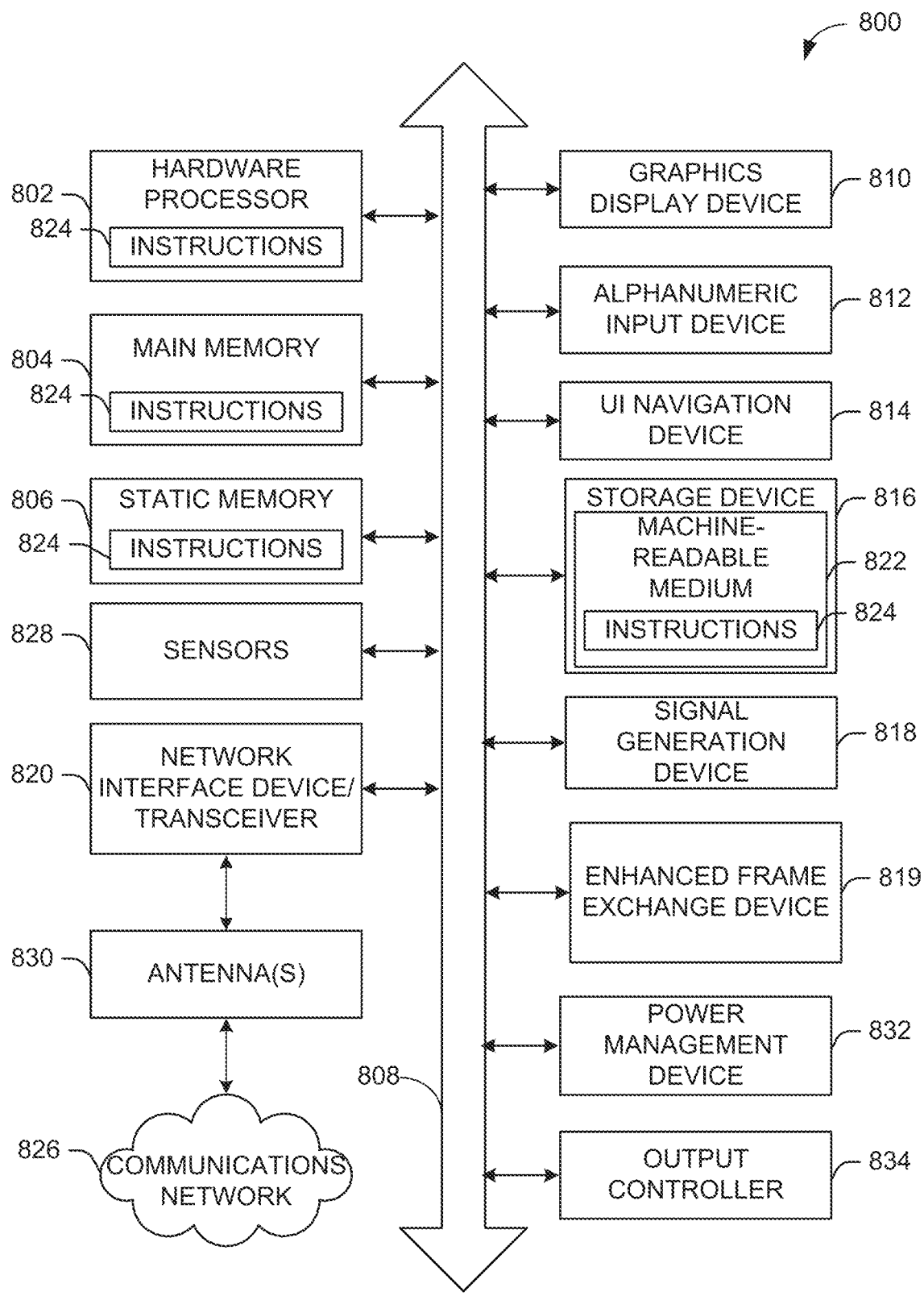
FIG. 8 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 7 and/or the example machine/system of FIG. 8.

One or more illustrative user device(s) 120 and/or AP(s) 102 may be operable by one or more user(s) 110. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate enhanced frame exchange 142 with one or more user devices 120.

It is understood that the above descriptions are for purposes of illustration and are not meant to be limiting.

Figure 2:
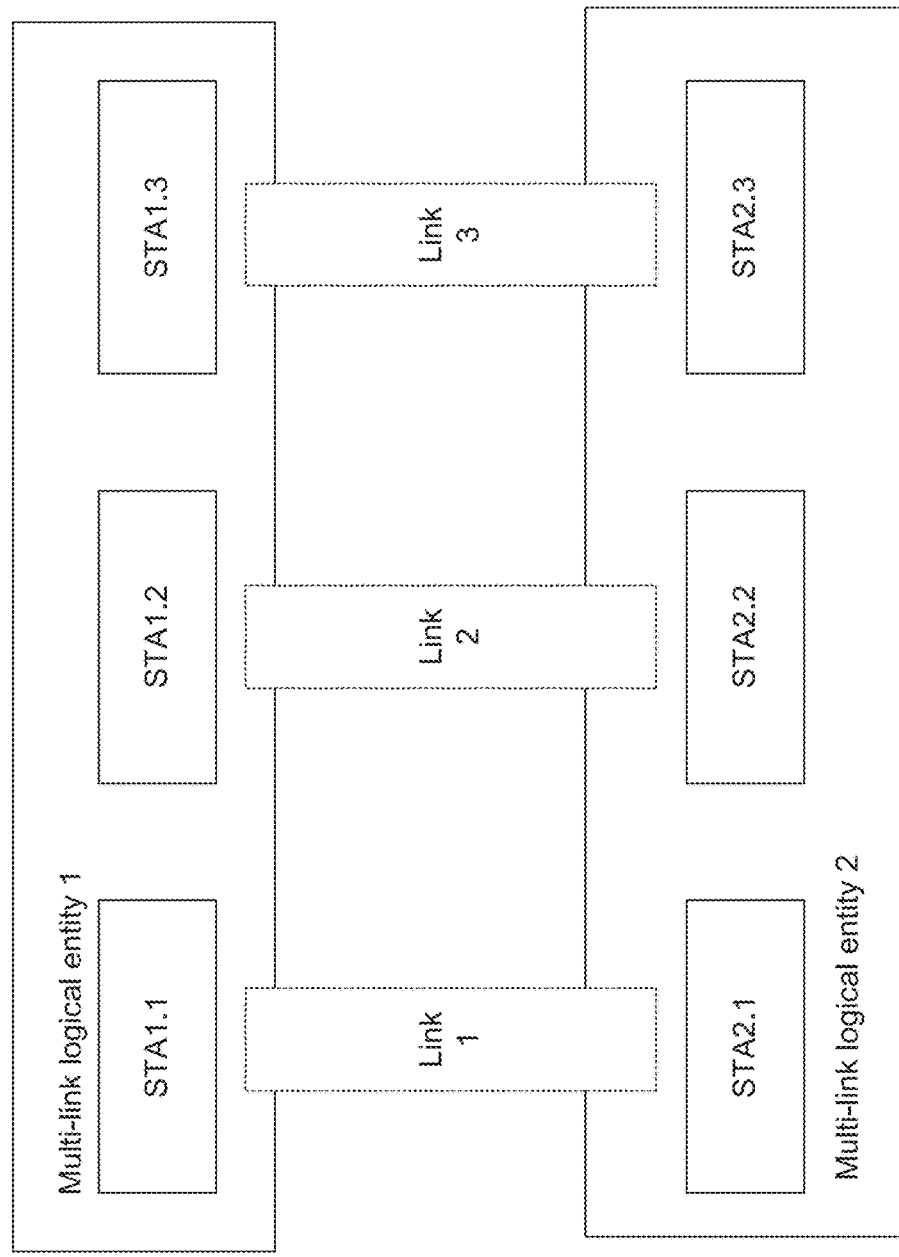
FIG. 2 depicts an illustrative schematic diagram for a multi-link device (MLD) between two logical entities, in accordance with one or more example embodiments of the present disclosure.

FIG. 2 depicts an illustrative schematic diagram 200 for a multi-link device (MLD) between two logical entities, in accordance with one or more example embodiments of the present disclosure.

Referring to FIG. 2, there are shown two multi-link logical entities on either side which includes multiple STAs that can set up links with each other. A multi-link logical entity may be a logical entity that contains one or more STAs. The logical entity has one MAC data service interface and primitives to the logical link control (LLC) and a single address associated with the interface, which can be used to communicate on the distribution system medium (DSM). It should be noted that a Multi-link logical entity allows STAs within the multi-link logical entity to have the same MAC address. It should also be noted that the exact name can be changed.

In this example of FIG. 2, the multi-link logical entity 1 and multi-link logical entity 2 may be two separate physical devices, where each one comprises a number of virtual or logical devices. For example, multi-link logical entity 1 may comprise three STAs, STA1.1, STA1.2, and STA1.3 and multi-link logical entity 2 that may comprise three STAs, STA2.1, STA2.2, and STA2.3. The example shows that logical device STA1.1 is communicating with logical device STA2.1 over link 1, that logical device STA1.2 is communicating with logical device STA2.2 over link 2, and that device STA1.3 is communicating with logical device STA2.3 over link 3.

Figure 3:
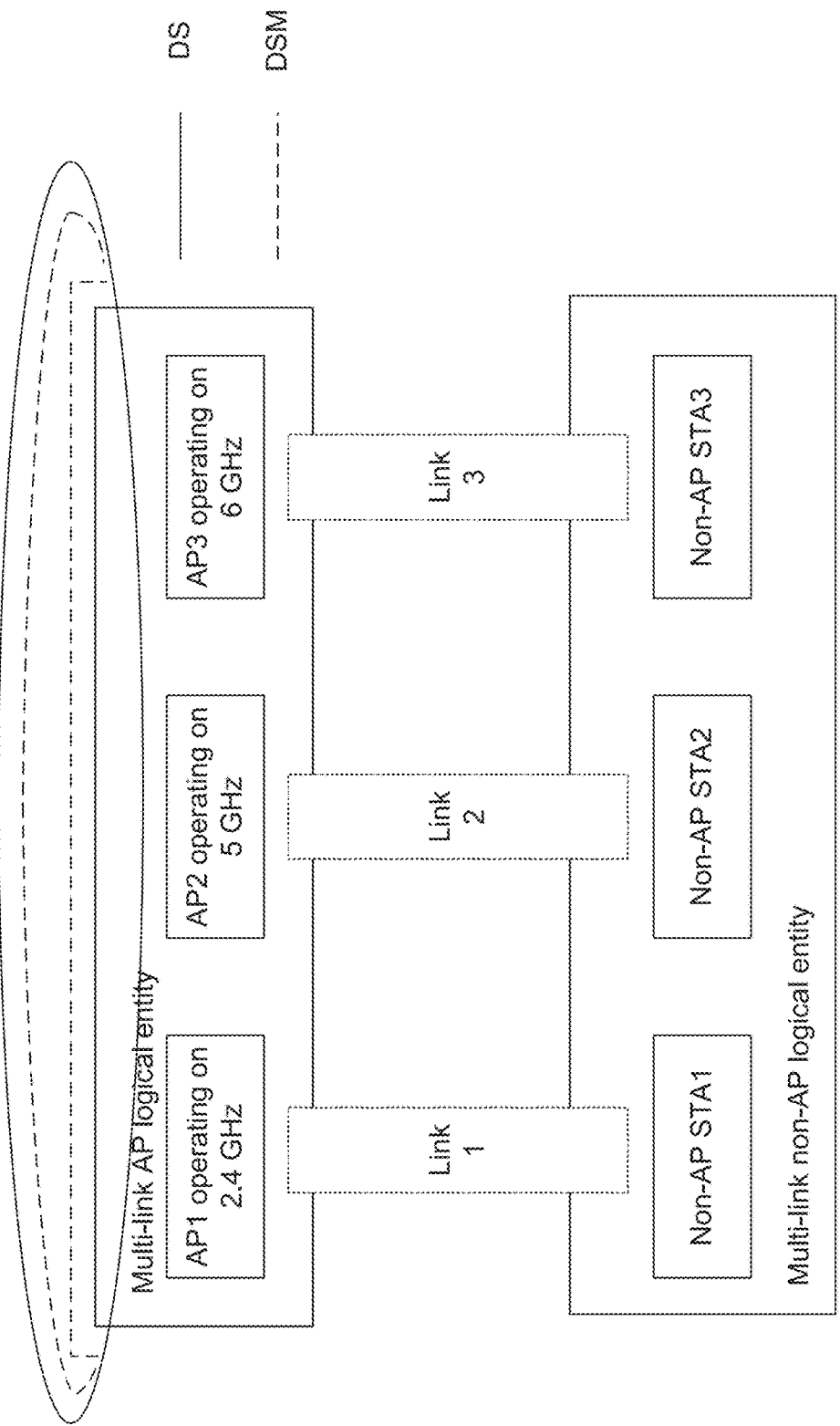
FIG. 3 depicts an illustrative schematic diagram for a multi-link device (MLD) between AP with logical entities and a non-AP with logical entities, in accordance with one or more example embodiments of the present disclosure.

FIG. 3 depicts an illustrative schematic diagram 300 for a multi-link device (MLD) between AP with logical entities and a non-AP with logical entities, in accordance with one or more example embodiments of the present disclosure.

Referring to FIG. 3, there are shown two multi-link logical entities on either side which includes multiple STAs that can set up links with each other. For infrastructure framework, a multi-link AP logical entity may include APs (e.g., AP1, AP2, and AP3) on one side, and multi-link non-AP logical entity, which may include non-APs (STA1, STA2, and STA3) on the other side. The detailed definition is shown below. Multi-link AP logical entity (AP MLLE also can be referred to as AP MLD): A multi-link logical entity, where each STA within the multi-link logical entity is an EHT AP. It should be noted that the term MLLE and MLD are interchangeable and indicate the same type of entity. Throughout this disclosure, MLLE may be used but anywhere the MLLE term is used, it can be replaced with MLD. Multi-link non-AP logical entity (non-AP MLLE, also can be referred to as non-AP MLD): A multi-link logical entity, where each STA within the multi-link logical entity is a non-AP EHT STA. It should be noted that this framework is a natural extension from the one link operation between two STAs, which are AP and non-AP STA under the infrastructure framework (e.g., when an AP is used as a medium for communication between STAs).

In the example of FIG. 3, the multi-link AP logical entity and multi-link non-AP logical entity may be two separate physical devices, where each one comprises a number of virtual or logical devices. For example, the multi-link AP logical entity may comprise three APs, AP1 operating on 2.4 GHz, AP2 operating on 5 GHz, and AP3 operating on 6 GHz. Further, the multi-link non-AP logical entity may comprise three non-AP STAs, STA1 communicating with AP1 on link 1, STA2 communicating with AP2 on link 2, and STA3 communicating with AP3 on link 3.

The multi-link AP logical entity is shown in FIG. 3 to have access to a distribution system (DS), which is a system used to interconnect a set of BSSs to create an extended service set (ESS). The multi-link AP logical entity is also shown in FIG. 3 to have access to a distribution system medium (DSM), which is the medium used by a DS for BSS interconnections. Simply put, DS and DSM allow the AP to communicate with different BSSs.

It should be understood that although the example shows three logical entities within the multi-link AP logical entity and the three logical entities within the multi-link non-AP logical entity, this is merely for illustration purposes and that other numbers of logical entities with each of the multi-link AP and non-AP logical entities may be envisioned.

FIGS. 4 and 5 depict a Table of elements included in a probe request frame.

Some of the elements that are typically included in the frame body of a probe request frame are shown in Table 1 (FIGS. 4 and 5). These elements may be added whenever a condition is met. For example, looking at HT Capabilities element 7 (or other elements) in Table 1, it is shown to be present in the probe request frame when dot11HighThroughputOptionImplemented is true. This indicates that if the condition is true, the HT capabilities element would be included in the probe request frame. However, with the enhanced frame exchange system, this element does not have to be included in the probe request even if the condition is true.

In one or more embodiments, an enhanced frame exchange system may facilitate the following to reduce element fingerprint in probe request frame. In one or more embodiments, an enhanced frame exchange system may allow a device to decide whether it wants to include a specific element or not based on privacy considerations rather than capability support. Note that in the current 802.11 standard, an element shall be included only if certain functionality is supported.

In one or more embodiments, an enhanced frame exchange system may facilitate that an element that is optionally present is not included in the probe request frame to reduce element fingerprint.

In one or more embodiments, an enhanced frame exchange system may facilitate that only the SSID element is required to be present in the probe request frame to reduce element fingerprint. The value of the SSID element is suggested to be wildcard SSID to eliminate tracking in 2.4 GHz band or 5 GHz band. The value of the SSID element may be set to other values in 6 GHz band. In 6 GHz band, broadcast addressed probe request with wildcard SSID is prohibited. A standardized mode of probe request frame with only the SSID element can be defined or recommended.

If an element is included in the probe request frame, have a defined standardized setting for the element to reduce element fingerprint and/or randomize the setting in the element to a legit indication to prevent from element fingerprint if the setting is not about reception capability for the solicited probe response.

In one or more embodiments, an enhanced frame exchange system may allow any element to be included with randomized indication to prevent element fingerprinting.

In one or more embodiments, an enhanced frame exchange system may randomize the setting if the setting is not about reception capability for the solicited probe response. Essentially, each transmission may have a completely different indication, which makes any element fingerprint tracking algorithm useless.

In one or more embodiments, an enhanced frame exchange system may facilitate including a padding element with randomized length and content to avoid tracking based on the length of the probe request frame. A probe request frame can be standardized to pad to a specific length. Any combination of the above proposal can be used in the probe request frame.

In one or more embodiments, an enhanced frame exchange system may facilitate that the receiver addressed can be individually addressed or group addressed for the standardized mode of probe request frame.

In one or more embodiments, an enhanced frame exchange system may facilitate that the probe response frame may use non-high throughput (HT) format with a mandatory data rate to guarantee that the sender of the probe request can receive the frame. This is required when various capability elements are removed from the standardized probe request frame.

In one or more embodiments, an enhanced frame exchange system may facilitate that the probe response frame may include elements based on the support capability of the AP rather than whether a corresponding element is included in the probe request frame.

In one or more embodiments, an enhanced frame exchange system may encrypt the elements in the probe request frames based on identifier privacy mechanism. The probe request has the receiver address to be individually addressed. The assumption is that the sender of the probe request frame has the public key of the AP that is going to receive the individually addressed frame.

In one or more embodiments, an enhanced frame exchange system may facilitate that the probe request has receiver address to be group addressed. Only the AP that can decrypt the probe request frame will respond with the probe response frame. The assumption here is that only the AP with the right public key used by the sender of the probe request frame to encrypt will decrypt the probe request frame.

In one or more embodiments, an enhanced frame exchange system may facilitate that elements in the Probe response frame may be encrypted. This can be used when the probe response frame is individual addressed. This can be used based on an indication in the probe request frame to request for elements in the probe response frame to be encrypted. This avoids the elements in the probe response frame used as a source of element fingerprint and link various MAC addresses used to send probe request frame. This can be used when the probe response frame is group addressed. STA that does not request encrypt probe response frame will stop processing the probe response frame.

An 802.11 non-access point (AP) station (STA), which can be any wireless device like a mobile phone, connects to the networks through an 802.11 access point (AP).

Before connecting to any access point, an 802.11 non-AP STA starts with scanning the neighboring APs and find a suitable access point. One of the methods to scan neighboring (APs) is to send a probe request, and a neighboring AP that receives the probe request responds with a probe response to notify the non-AP STA of its existence. An 802.11 non-AP STA may constantly send the probe request with TA set to its own MAC address, and the MAC address in the probe request has become a convenient way for others to track a non-AP STA and link the non-AP STA to a specific person. This has raised privacy concerns.

802.11 currently addresses this problem by allowing a non-AP STA to randomize its MAC address before sending a probe request. The specific rule is described below and expands to any frame that may be sent by a non-AP STA before connecting to an AP.

MAC privacy enhancements are enabled on a non-AP STA when dot11MACPrivacyActivated is set to true. The STA shall periodically change its MAC address to a random value while not associated with a BSS. The STA shall construct the randomized MAC address from the locally administered address space as defined in IEEE Std 802®-2014 and IEEE Std 802c™-2017. The actual period used when changing a MAC address is implementation dependent and outside the scope of this standard.

Note that "associated to a BSS" means that the STA has connected to an AP and connected to the network through the AP. A Basic service set (BSS) is a set that includes all the stations that are synchronized to an AP.

Now, it turns out that MAC address is not the only field in a probe request frame that can be used to track an STA.

The sequence number (SN) field in a probe request frame usually increases sequentially and the number may be used to link different transmissions with different MAC addresses.

The scrambler in a transmission also follows specific evolving patterns and by observing the scrambler, the information may be used to link different transmissions with different MAC addresses. The current 802.11 standard addresses the above problems by having sequence number and scrambler reset, which chooses a random value after having a new MAC address as shown below.

Every time a MAC address is changed to a new random value, counters in all sequence number spaces used to identify each MSDU or MMPDU shall be reset and the STA shall set the TXVECTOR parameter SCRAMBLER_RESET to RESET_SCRAMBLER on the next transmitted PPDU.

If dot11MACPrivacyActivated is true, the counter in each sequence number space shall be set to a random number modulo 4096 when the STA's MAC address is changed.

If the TXVECTOR parameter SCRAMBLER_RESET is set to RESET_SCRAMBLER and dot11MACPrivacyActivated is true, the initial state of the scrambler shall be set to a nonzero random value not based on the scrambler value at the end of the last transmitted PPDU, before changes based on CH_BANDWIDTH_IN_NON_HT defined above are applied.

Finally, a non-AP STA may connect to a preferred network, leave the network, and connect to a network again (i.e., AP with the same SSID). If the non-AP STA always uses the same MAC address while connecting to a network, then this creates a pattern for a non-AP STA, which can then again be used to track the non-AP STA and link to a specific person.

The current 802.11 standard addresses this problem by allowing a non-AP STA to randomize MAC address while trying to connect to a new AP as shown below.

If such a non-AP STA starts any transaction that establishes state bound to a MAC address and might elect to establish an association or establish a transaction state with a discovered BSS, it shall check the value of dot11LocallyAdministeredMACConfig and shall configure its MAC address according to the rules of the local address space before the start of the transaction.

In one or more embodiments, each MLD has an MLD MAC address. Each STA of an MLD also has an STA MAC address. Different STAs of an MLD have different MAC addresses. The MAC address of the MLD may be the same or different from one of the MAC addresses of the STAs of the MLD. The MAC address of MLD is introduced to ensure that the traditional mapping of AP and STA from a high layer point of view is preserved under multi-link, and the mapping is replaced with AP MLD and non-AP MLD independent of the MAC addresses used by the STAs of the MLD.

For a non-AP MLD to connect to the network through AP MLD, a multi-link setup procedure is introduced. The multi-link setup procedure involves frame exchange between two MLDs that exchange information of different links and establishes the mapping of non-AP MLD and AP MLD from the view of the higher layer. This is similar to the traditional association process between a non-AP STA and an AP, where the association frame is exchanged, information of the link between the non-AP STA and the AP is exchanged, and the mapping of non-AP STA and AP from the view of a higher layer is established.

Currently, the connection between a non-AP STA and an AP is called STA association. The connection between a non-AP MLD and an AP MLD is called MLD association after a multi-link setup after non-AP MLD and AP MLD.

In one or more embodiments, an MLD privacy system may facilitate changing an STA MAC address while a non-AP MLD establishes a new association, that is, after a multi-link setup, with a new AP MLD. When the non-AP MLD associates with a different AP MLD in an extended service set (ESS), the non-AP MLD is allowed to choose a different STA address different from the previous association with a previous AP MLD.

In one or more embodiments, an MLD privacy system may facilitate the proposal for the non-AP MLD to change an individual STA MAC address after association with an AP MLD. The non-AP MLD is allowed to change an individual STA address of the affiliated STA. A non-AP MLD may remember the STA address that has been used and may not randomize that address to an STA address that has been used before unless a new pairwise transient key (PTK) is going to be used after randomizing the STA address. When the non-AP MLD changes the STA address of the affiliated STA, the following parameters is also changed. AID assigned to the non-AP MLD. For each sequence number (SN) space, the SN of each SN space may be changed for both non-AP MLD and AP MLD.

In one or more embodiments, an MLD privacy system may add a random offset modular the maximum size of the sequence number space as an originator to all the existing queueing individual addressed frames using the sequence number. Further, this can also be added to the next sequence number to be assigned for an individually addressed frame, and the originator record that uses the SN number.

In one or more embodiments, each traffic identifier (TID) of an individual addressed QoS data may have an SN space as an originator.

In one or more embodiments, the individual addressed management frame has an SN space as an originator. Each access category (AC) of a quadrature mirror filter (QMF), if used, has an SN space as an originator. A time priority management frame, if used, may have an SN space as an originator. If a block acknowledgment (BA) is negotiated for a TID, the originator of the negotiation may have a transmit buffer control record that uses SN. As a recipient, an MLD privacy system may add a random offset modular the maximum size of the sequence number space decided by the originator to all recipient record that uses the SN number. Each TID of an individual addressed QoS data may have a duplicate check record as a recipient. The individual addressed management frame may have a duplicate check record as a recipient. Each AC of a QMF, if used, has a duplicate check record as a recipient.

In one or more embodiments, if a time priority management frame is used, it may have an SN space as an originator. If BA is negotiated for a TID, the recipient may have received reordering buffer control record and scoreboard context control record that uses SN. For non-AP MLD, adding or subtracting a random offset, to the PN assigned to the existing operation, the next PN to be assigned. If a random offset is added, then the result of each value cannot be higher than the maximum value of the PN space. If a random offset is subtracted, then the result of each value cannot be lower than 0. For AP MLD, update the replay counter based on adding or subtracting the random offset of the non-AP MLD. For AP MLD, adding a random offset, to the PN assigned to an existing operation, the next PN to be assigned. If a random offset is added, then the result of each value shall not be higher than the maximum value of the PN space. If a random offset is added, then the result of each value shall be higher than the maximum value of the PN that is currently used. For non-AP MLD, update the replay counter based on adding or subtracting the random offset of the non-AP MLD. For AP MLD and non-AP MLD, if updating PN is impossible, then initiate a 4-way handshake to update PTK. Each STA shall set the TXVECTOR parameter SCRAMBLER_RESET to RESET_SCRAMBLER on the next transmitted PPDU.

In one or more embodiments, an MLD privacy system may facilitate the procedure for AP MLD and non-AP MLD to know the new STA MAC address and parameters to be used.

In one or more embodiments, in Option 1, a non-AP MLD may send a request frame including the updated STA address of the non-AP MLD and other parameters. The AP MLD sends a response frame to confirm the updated STA address and indicate other parameters. The request/response frame may be a protected management frame and the frame body is protected to avoid revelation.

The request frame may indicate the random offset for each SN space where non-AP MLD is the originator. The request frame may indicate the random offset for PN space where non-AP MLD is the originator. The response frame may indicate the random offset for each SN space where AP MLD is the originator. The response frame may indicate the random offset for PN space where AP MLD is the originator. The response frame may include the new AID if the request frame is sent by non-AP MLD so that the AID of the non-AP MLD can be updated. The response frame may indicate if the updated MAC address requested by the non-AP MLD conflict with MAC address used by other STAs and reject the request. AP MLD and non-AP MLD may change based on the exchange parameters at an agreed time after request/response exchange. The agreed time may be the following delivery traffic indication map (DTIM) target beacon transmission time (TBTT) or just TBTT. The agreed time may be indicated in the request frame. The agreed time may be indicated in the response frame.

In one or more embodiments, in Option 2, a non-AP MLD may change MAC address and parameters based on a pre-agreed or predetermined pattern every pre-agreed predetermined period. The period can be a multiple of delivery traffic indication map (DTIM) intervals or Beacon intervals. The time to change can be determined by indicating a DTIM Beacon target beacon transmission time (TBTT) time and all the following TBTTs separated by the period or TSF0 and all the TBTTs separated by the period.

In one or more embodiments, an AP MLD can decide the pre-agreed period and time for non-AP MLDs that want to randomize an STA address in order to make it more difficult for an attacker to track. AP MLD and each non-AP MLD agree on a seed for each random number that needs to be generated like MAC address, SN offset, and PN offset. AP MLD and non-AP MLD can then use the seed to generate the same random number independently without exchange parameters during the time that a non-AP MLD has to change MAC address and parameters. The seed can be exchanged through a 4-way handshake or protected management frame. AP MLD and non-AP MLD agrees on AID change in a specific range. AP MLD indicates the range through a protected management frame. AP MLD does not allocate AID in the range to other STAs or non-AP MLDs that do not want to change MAC address. AP MLD can indicate a seed for each non-AP MLD to generate a sequence of AID permutations in the specific range. For example, AID range 100 to 103, and a permutation (3,4,1,2) means AID change like the following 100→102, 101→103, 102→100, 103→101.

In one or more embodiments, an MLD privacy system may facilitate A2 address filtering. For example, an MLD may filter incoming frames not just based on A1 (RA address) but also A2 (TA address). A1 has to match the MAC address of the STA of the MLD (say STA 1). A2 has to match the MAC address of the STA of the peer MLD that establishes a link with STA1. This A2 address filtering is used to make sure that if different MLDs happen to connect to a different network through different AP MLDs, and chooses the same MAC address for the STA, then the collision will not be a problem.

It is understood that the above descriptions are for purposes of illustration and are not meant to be limiting.

Figure 6:
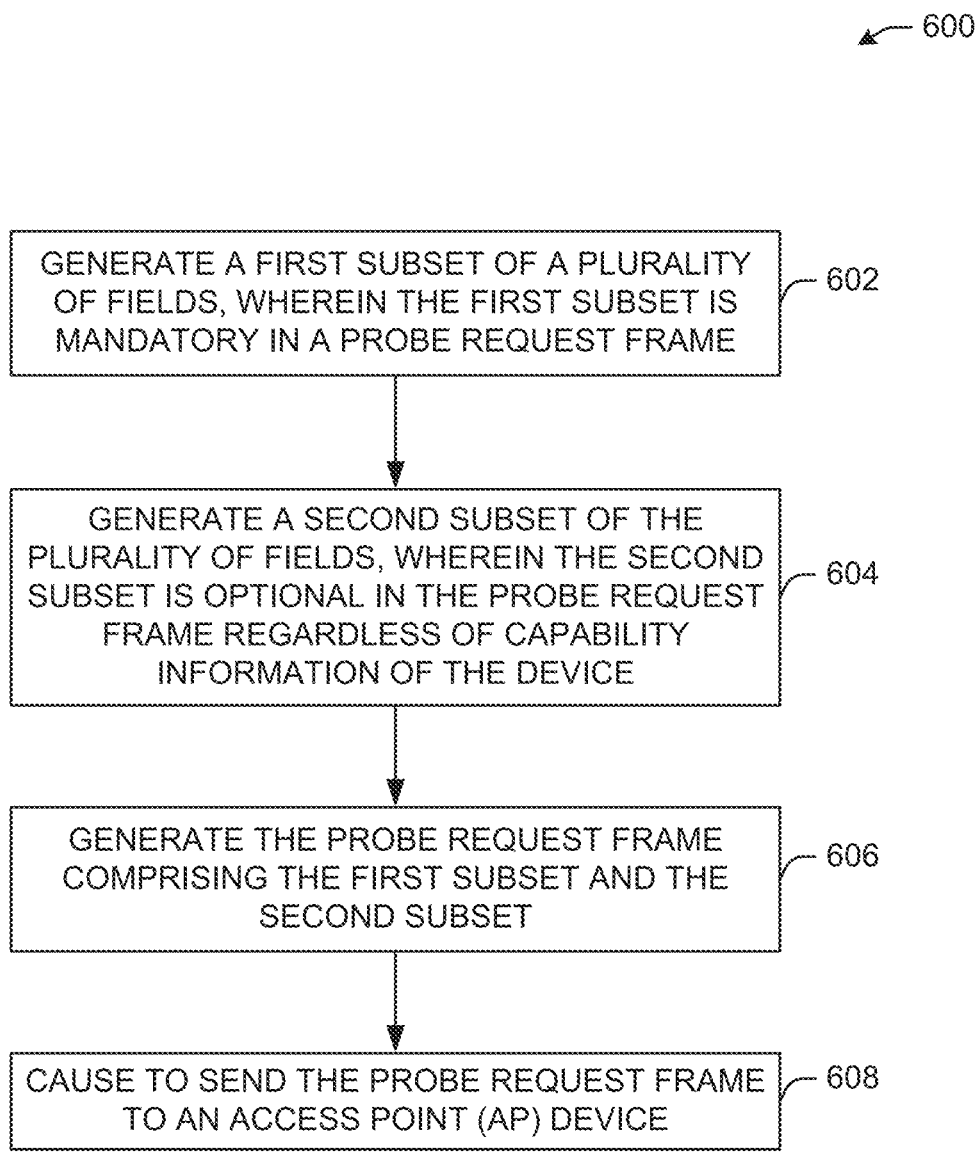
FIG. 6 illustrates a flow diagram of a process for an illustrative enhanced frame exchange system, in accordance with one or more example embodiments of the present disclosure.

FIG. 6 illustrates a flow diagram of illustrative process 600 for an enhanced frame exchange system, in accordance with one or more example embodiments of the present disclosure.

At block 602, a device (e.g., the user device(s) 120 and/or the AP 102 of FIG. 1 and/or enhanced frame exchange device 819 of FIG. 8) may generate a first subset of a plurality of fields, wherein the first subset is mandatory in a probe request frame.

At block 604, the device may generate a second subset of the plurality of fields, wherein the second subset is optional in the probe request frame regardless of capability information of the device. The first subset may be comprised of only a service set identifier (SSID) element. The second subset may be comprised of, a request element, an extended request element, a fast initial link setup (FILS) request parameter element, a short SSID list element, one or more vendor specific elements, a probe request variant multiple links (ML) element, and a known BSSID element.

At block 606, the device may generate the probe request frame comprising the first subset and the second subset.

At block 608, the device may cause to send the probe request frame to an access point (AP) device. The device may be a first STA that is affiliated with a non-AP multi-link device (MLD). The device may maintain an MLD address of the non-AP MLD. The device may randomize a medium access control (MAC) address of the first STA of the non-AP MLD. The device may send a frame to an associated AP MLD, wherein the frame comprises an updated MAC address of the first STA. The device may receive a response frame from the associated AP MLD confirming the updated MAC address of the first STA. The updated MAC address of the first STA is updated based on a predetermined pattern for a predetermined period between the non-AP MLD and the associated AP MLD. The device may have the first STA of the non-AP MLD set a TXVECTOR parameter SCRAMBLER_RESET to RESET_SCRAMBLER on a next transmitted physical layer (PHY) protocol data unit (PPDU). The device may receive a frame from the associated AP MLD to change an assigned association identifier (AID) of the non-AP MLD. The device may receive a random offset for a sequence number (SN). The device may add a random offset modular the maximum size of a sequence number space to all recipient record of the non-AP MLD that uses the SN number. The device may perform message filtering on incoming frames based on a receiving station address (RA) and on a transmitting station address (TA), wherein the RA matches a MAC address of a first STA of the non-AP MLD, and wherein the TA matches the MAC address of a first AP of an associated AP MLD. It is understood that the above descriptions are for purposes of illustration and are not meant to be limiting.

FIG. 7 shows a functional diagram of an exemplary communication station 700, in accordance with one or more example embodiments of the present disclosure. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), an enhanced frame exchange device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 802 for generation and processing of the baseband signals and for controlling operations of the main memory 804, the storage device 816, and/or the enhanced frame exchange device 819. The baseband processor may be provided on a single radio card, a single chip, or an integrated circuit (IC).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The enhanced frame exchange device 819 may carry out or perform any of the operations and processes (e.g., process 600) described and shown above.

It is understood that the above are only a subset of what the enhanced frame exchange device 819 may be configured to perform and that other functions included throughout this disclosure may also be performed by the enhanced frame exchange device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 9:
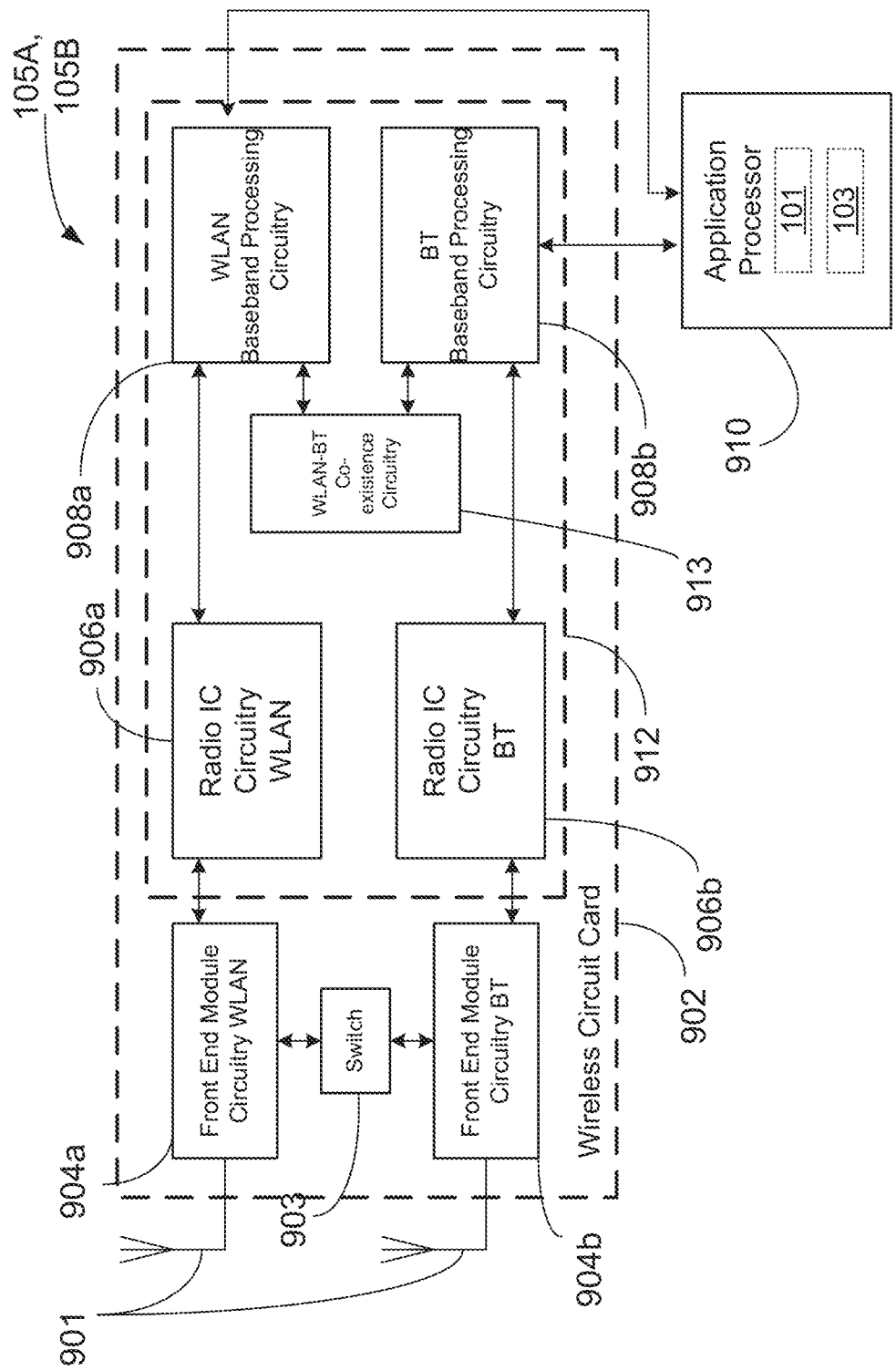
FIG. 9 is a block diagram of a radio architecture in accordance with some examples.

FIG. 9 is a block diagram of a radio architecture 105A, 105B in accordance with some embodiments that may be implemented in any one of the example AP 102 and/or the example STA 120 of FIG. 1. Radio architecture 105A, 105B may include radio front-end module (FEM) circuitry 904a-b, radio IC circuitry 906a-b and baseband processing circuitry 908a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 904a-b may include a WLAN or Wi-Fi FEM circuitry 904a and a Bluetooth (BT) FEM circuitry 904b. The WLAN FEM circuitry 904a may include a receive signal path comprising circuitry configured to operate on WLAN RF signals received from one or more antennas 901, to amplify the received signals and to provide the amplified versions of the received signals to the WLAN radio IC circuitry 906a for further processing. The BT FEM circuitry 904b may include a receive signal path which may include circuitry configured to operate on BT RF signals received from one or more antennas 901, to amplify the received signals and to provide the amplified versions of the received signals to the BT radio IC circuitry 906b for further processing. FEM circuitry 904a may also include a transmit signal path which may include circuitry configured to amplify WLAN signals provided by the radio IC circuitry 906a for wireless transmission by one or more of the antennas 901. In addition, FEM circuitry 904b may also include a transmit signal path which may include circuitry configured to amplify BT signals provided by the radio IC circuitry 906b for wireless transmission by the one or more antennas 901. In the embodiment of FIG. 9, although FEM 904a and FEM 904b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 906a-b as shown may include WLAN radio IC circuitry 906a and BT radio IC circuitry 906b. The WLAN radio IC circuitry 906a may include a receive signal path which may include circuitry to down-convert WLAN RF signals received from the FEM circuitry 904a and provide baseband signals to WLAN baseband processing circuitry 908a. BT radio IC circuitry 906b may in turn include a receive signal path which may include circuitry to down-convert BT RF signals received from the FEM circuitry 904b and provide baseband signals to BT baseband processing circuitry 908b. WLAN radio IC circuitry 906a may also include a transmit signal path which may include circuitry to up-convert WLAN baseband signals provided by the WLAN baseband processing circuitry 908a and provide WLAN RF output signals to the FEM circuitry 904a for subsequent wireless transmission by the one or more antennas 901. BT radio IC circuitry 906b may also include a transmit signal path which may include circuitry to up-convert BT baseband signals provided by the BT baseband processing circuitry 908b and provide BT RF output signals to the FEM circuitry 904b for subsequent wireless transmission by the one or more antennas 901. In the embodiment of FIG. 9, although radio IC circuitries 906a and 906b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 908a-b may include a WLAN baseband processing circuitry 908a and a BT baseband processing circuitry 908b. The WLAN baseband processing circuitry 908a may include a memory, such as, for example, a set of RAM arrays in a Fast Fourier Transform or Inverse Fast Fourier Transform block (not shown) of the WLAN baseband processing circuitry 908a. Each of the WLAN baseband circuitry 908a and the BT baseband circuitry 908b may further include one or more processors and control logic to process the signals received from the corresponding WLAN or BT receive signal path of the radio IC circuitry 906a-b, and to also generate corresponding WLAN or BT baseband signals for the transmit signal path of the radio IC circuitry 906a-b. Each of the baseband processing circuitries 908a and 908b may further include physical layer (PHY) and medium access control layer (MAC) circuitry, and may further interface with a device for generation and processing of the baseband signals and for controlling operations of the radio IC circuitry 906a-b.

Referring still to FIG. 9, according to the shown embodiment, WLAN-BT coexistence circuitry 913 may include logic providing an interface between the WLAN baseband circuitry 908a and the BT baseband circuitry 908b to enable use cases requiring WLAN and BT coexistence. In addition, a switch 903 may be provided between the WLAN FEM circuitry 904a and the BT FEM circuitry 904b to allow switching between the WLAN and BT radios according to application needs. In addition, although the antennas 901 are depicted as being respectively connected to the WLAN FEM circuitry 904a and the BT FEM circuitry 904b, embodiments include within their scope the sharing of one or more antennas as between the WLAN and BT FEMs, or the provision of more than one antenna connected to each of FEM 904a or 904b.

In some embodiments, the front-end module circuitry 904a-b, the radio IC circuitry 906a-b, and baseband processing circuitry 908a-b may be provided on a single radio card, such as wireless radio card 902. In some other embodiments, the one or more antennas 901, the FEM circuitry 904a-b and the radio IC circuitry 906a-b may be provided on a single radio card. In some other embodiments, the radio IC circuitry 906a-b and the baseband processing circuitry 908a-b may be provided on a single chip or integrated circuit (IC), such as IC 912.

In some embodiments, the wireless radio card 902 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 908b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 10:
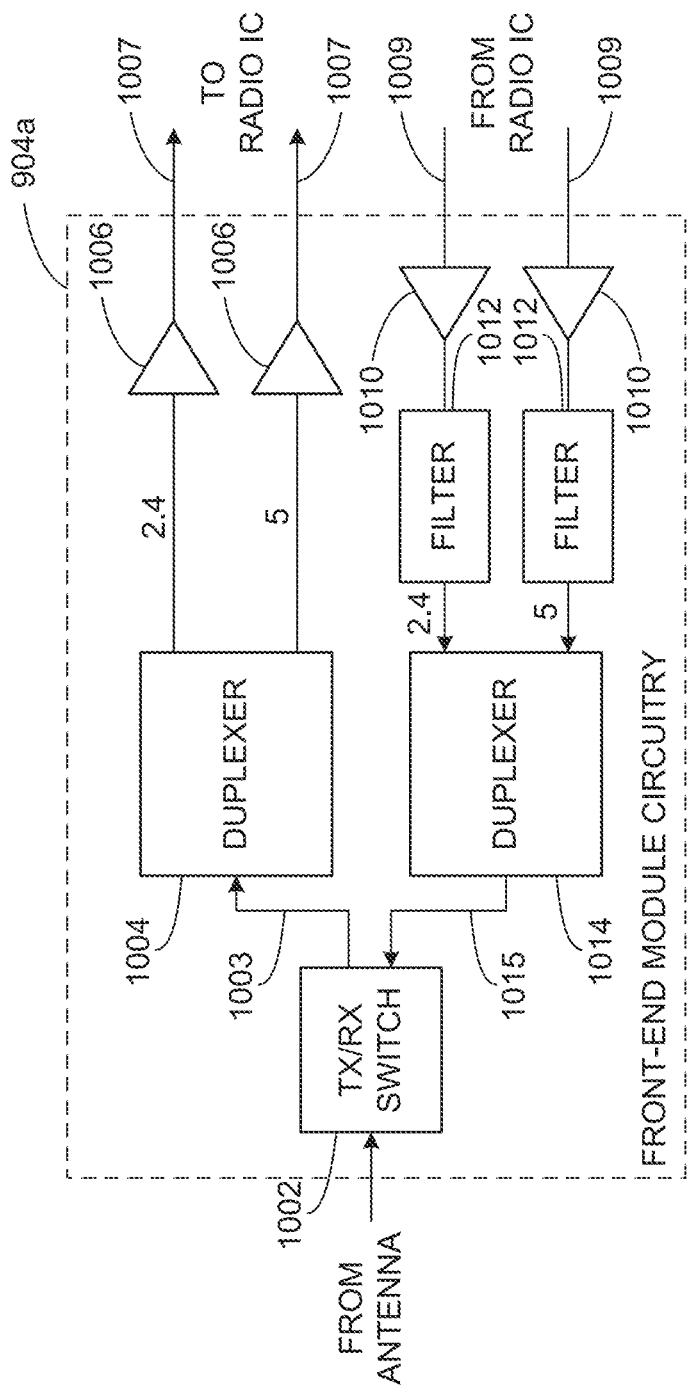
FIG. 10 illustrates an example front-end module circuitry for use in the radio architecture of FIG. 9, in accordance with one or more example embodiments of the present disclosure.

FIG. 10 illustrates WLAN FEM circuitry 904a in accordance with some embodiments. Although the example of FIG. 10 is described in conjunction with the WLAN FEM circuitry 904a, the example of FIG. 10 may be described in conjunction with the example BT FEM circuitry 904b (FIG. 9), although other circuitry configurations may also be suitable.

In some embodiments, the FEM circuitry 904a may include a TX/RX switch 1002 to switch between transmit mode and receive mode operation. The FEM circuitry 904a may include a receive signal path and a transmit signal path.

The receive signal path of the FEM circuitry 904a may include a low-noise amplifier (LNA) 1006 to amplify received RF signals 1003 and provide the amplified received RF signals 1007 as an output (e.g., to the radio IC circuitry 906a-b (FIG. 9)). The transmit signal path of the circuitry 904a may include a power amplifier (PA) to amplify input RF signals 1009 (e.g., provided by the radio IC circuitry 906a-b), and one or more filters 1012, such as band-pass filters (BPFs), low-pass filters (LPFs) or other types of filters, to generate RF signals 1015 for subsequent transmission (e.g., by one or more of the antennas 901 (FIG. 9)) via an example duplexer 1014.

In some dual-mode embodiments for Wi-Fi communication, the FEM circuitry 904a may be configured to operate in either the 2.4 GHz frequency spectrum or the 5 GHz frequency spectrum. In these embodiments, the receive signal path of the FEM circuitry 904a may include a receive signal path duplexer 1004 to separate the signals from each spectrum as well as provide a separate LNA 1006 for each spectrum as shown. In these embodiments, the transmit signal path of the FEM circuitry 904a may also include a power amplifier 1010 and a filter 1012, such as a BPF, an LPF or another type of filter for each frequency spectrum and a transmit signal path duplexer 1004 to provide the signals of one of the different spectrums onto a single transmit path for subsequent transmission by the one or more of the antennas 901 (FIG. 9). In some embodiments, BT communications may utilize the 2.4 GHz signal paths and may utilize the same FEM circuitry 904a as the one used for WLAN communications.

Figure 11:
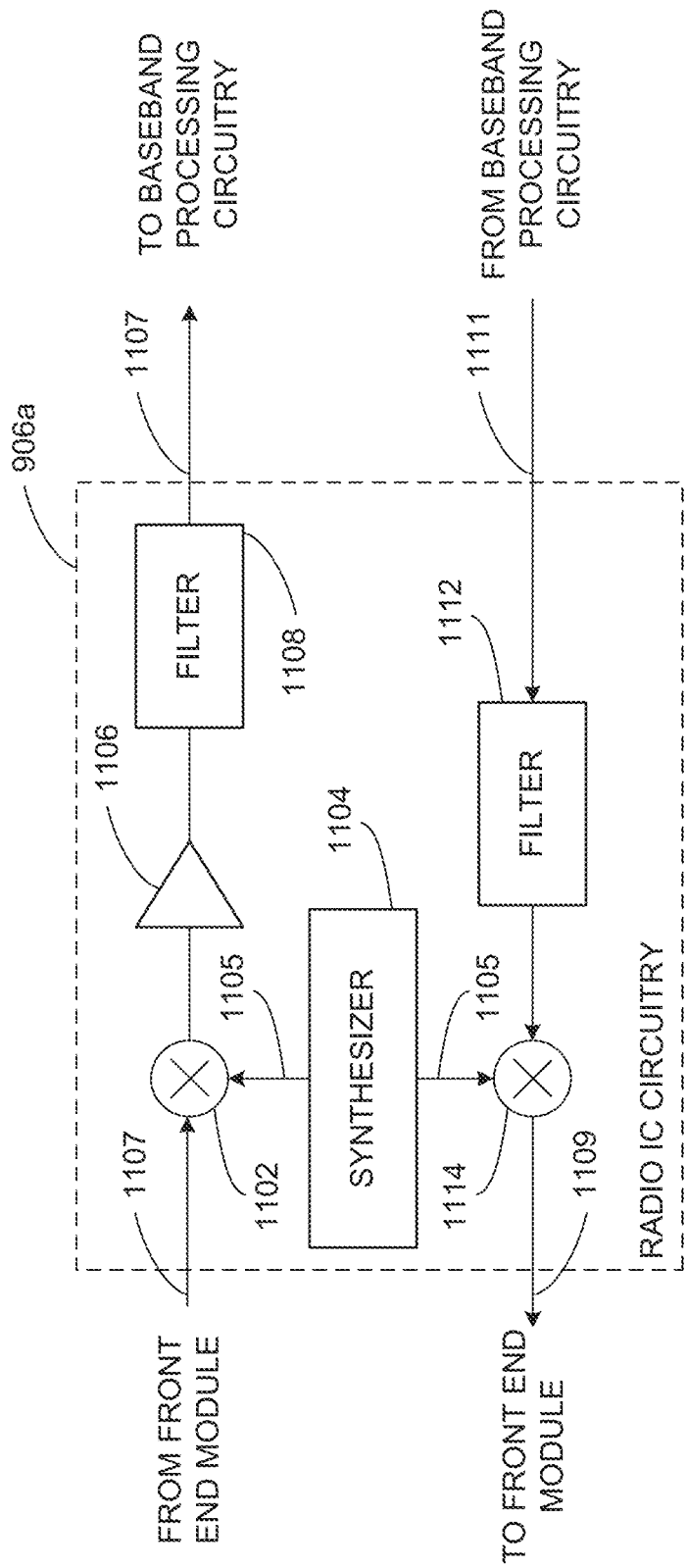
FIG. 11 illustrates an example radio IC circuitry for use in the radio architecture of FIG. 9, in accordance with one or more example embodiments of the present disclosure.

FIG. 11 illustrates radio IC circuitry 906a in accordance with some embodiments. The radio IC circuitry 906a is one example of circuitry that may be suitable for use as the WLAN or BT radio IC circuitry 906a/906b (FIG. 9), although other circuitry configurations may also be suitable. Alternatively, the example of FIG. 11 may be described in conjunction with the example BT radio IC circuitry 906b.

In some embodiments, the radio IC circuitry 906a may include a receive signal path and a transmit signal path. The receive signal path of the radio IC circuitry 906a may include at least mixer circuitry 1102, such as, for example, down-conversion mixer circuitry, amplifier circuitry 1106 and filter circuitry 1108. The transmit signal path of the radio IC circuitry 906a may include at least filter circuitry 1112 and mixer circuitry 1114, such as, for example, up-conversion mixer circuitry. Radio IC circuitry 906a may also include synthesizer circuitry 1104 for synthesizing a frequency 1105 for use by the mixer circuitry 1102 and the mixer circuitry 1114. The mixer circuitry 1102 and/or 1114 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 11 illustrates only a simplified version of a radio IC circuitry, and may include, although not shown, embodiments where each of the depicted circuitries may include more than one component. For instance, mixer circuitry 1114 may each include one or more mixers, and filter circuitries 1108 and/or 1112 may each include one or more filters, such as one or more BPFs and/or LPFs according to application needs. For example, when mixer circuitries are of the direct-conversion type, they may each include two or more mixers.

In some embodiments, mixer circuitry 1102 may be configured to down-convert RF signals 1007 received from the FEM circuitry 904a-b (FIG. 9) based on the synthesized frequency 1105 provided by synthesizer circuitry 1104. The amplifier circuitry 1106 may be configured to amplify the down-converted signals and the filter circuitry 1108 may include an LPF configured to remove unwanted signals from the down-converted signals to generate output baseband signals 1107. Output baseband signals 1107 may be provided to the baseband processing circuitry 908*a-b* (FIG. 9) for further processing. In some embodiments, the output baseband signals 1107 may be zero-frequency baseband signals, although this is not a requirement. In some embodiments, mixer circuitry 1102 may comprise passive mixers, although the scope of the embodiments is not limited in this respect.

In some embodiments, the mixer circuitry 1114 may be configured to up-convert input baseband signals 1111 based on the synthesized frequency 1105 provided by the synthesizer circuitry 1104 to generate RF output signals 1009 for the FEM circuitry 904*a-b*. The baseband signals 1111 may be provided by the baseband processing circuitry 908*a-b* and may be filtered by filter circuitry 1112. The filter circuitry 1112 may include an LPF or a BPF, although the scope of the embodiments is not limited in this respect.

In some embodiments, the mixer circuitry 1102 and the mixer circuitry 1114 may each include two or more mixers and may be arranged for quadrature down-conversion and/or up-conversion respectively with the help of synthesizer 1104. In some embodiments, the mixer circuitry 1102 and the mixer circuitry 1114 may each include two or more mixers each configured for image rejection (e.g., Hartley image rejection). In some embodiments, the mixer circuitry 1102 and the mixer circuitry 1114 may be arranged for direct down-conversion and/or direct up-conversion, respectively. In some embodiments, the mixer circuitry 1102 and the mixer circuitry 1114 may be configured for super-heterodyne operation, although this is not a requirement.

Mixer circuitry 1102 may comprise, according to one embodiment: quadrature passive mixers (e.g., for the inphase (I) and quadrature phase (Q) paths). In such an embodiment, RF input signal 1007 from FIG. 11 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1105 of synthesizer 1104 (FIG. 11). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1007 (FIG. 10) may comprise a balanced signal, although the scope of the embodiments is not limited in this respect. The I and Q baseband output signals may be provided to low-noise amplifier, such as amplifier circuitry 1106 (FIG. 11) or to filter circuitry 1108 (FIG. 11).

In some embodiments, the output baseband signals 1107 and the input baseband signals 1111 may be analog baseband signals, although the scope of the embodiments is not limited in this respect. In some alternate embodiments, the output baseband signals 1107 and the input baseband signals 1111 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1104 may be a fractional-N synthesizer or a fractional N/N+1 synthesizer, although the scope of the embodiments is not limited in this respect as other types of frequency synthesizers may be suitable. For example, synthesizer circuitry 1104 may be a delta-sigma synthesizer, a frequency multiplier, or a synthesizer comprising a phase-locked loop with a frequency divider. According to some embodiments, the synthesizer circuitry 1104 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1104 may be provided by a voltage controlled oscillator (VCO), although that is not a requirement. A divider control input may further be provided by either the baseband processing circuitry 908*a-b* (FIG. 9) depending on the desired output frequency 1105. In some embodiments, a divider control input (e.g., N) may be determined from a look-up table (e.g., within a Wi-Fi card) based on a channel number and a channel center frequency as determined or indicated by the example application processor 910. The application processor 910 may include, or otherwise be connected to, one of the example secure signal converter 101 or the example received signal converter 103 (e.g., depending on which device the example radio architecture is implemented in).

In some embodiments, synthesizer circuitry 1104 may be configured to generate a carrier frequency as the output frequency 1105, while in other embodiments, the output frequency 1105 may be a fraction of the carrier frequency (e.g., one-half the carrier frequency, one-third the carrier frequency). In some embodiments, the output frequency 1105 may be a LO frequency (fLO).

Figure 12:
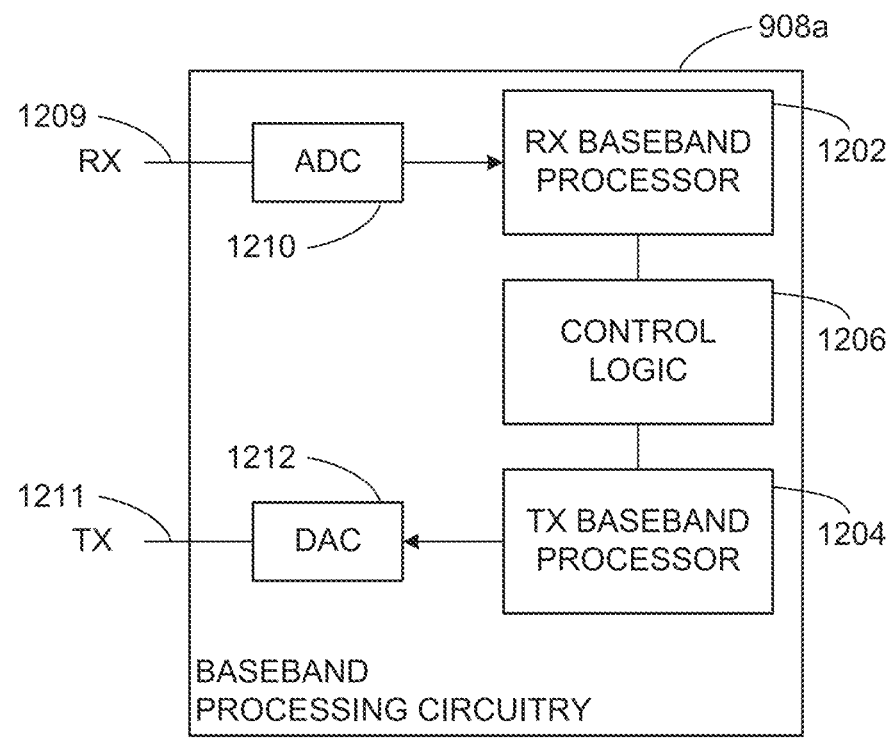
FIG. 12 illustrates an example baseband processing circuitry for use in the radio architecture of FIG. 9, in accordance with one or more example embodiments of the present disclosure.

FIG. 12 illustrates a functional block diagram of baseband processing circuitry 908*a* in accordance with some embodiments. The baseband processing circuitry 908*a* is one example of circuitry that may be suitable for use as the baseband processing circuitry 908*a* (FIG. 9), although other circuitry configurations may also be suitable. Alternatively, the example of FIG. 11 may be used to implement the example BT baseband processing circuitry 908*b* of FIG. 9.

The baseband processing circuitry 908*a* may include a receive baseband processor (RX BBP) 1202 for processing receive baseband signals 1109 provided by the radio IC circuitry 906*a-b* (FIG. 9) and a transmit baseband processor (TX BBP) 1204 for generating transmit baseband signals 1111 for the radio IC circuitry 906*a-b*. The baseband processing circuitry 908a may also include control logic 1206 for coordinating the operations of the baseband processing circuitry 908a.

In some embodiments (e.g., when analog baseband signals are exchanged between the baseband processing circuitry 908a-b and the radio IC circuitry 906a-b), the baseband processing circuitry 908a may include ADC 1210 to convert analog baseband signals 1209 received from the radio IC circuitry 906a-b to digital baseband signals for processing by the RX BBP 1202. In these embodiments, the baseband processing circuitry 908a may also include DAC 1212 to convert digital baseband signals from the TX BBP 1204 to analog baseband signals 1211.

In some embodiments that communicate OFDM signals or OFDMA signals, such as through baseband processor 908a, the transmit baseband processor 1204 may be configured to generate OFDM or OFDMA signals as appropriate for transmission by performing an inverse fast Fourier transform (IFFT). The receive baseband processor 1202 may be configured to process received OFDM signals or OFDMA signals by performing an FFT. In some embodiments, the receive baseband processor 1202 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 9, in some embodiments, the antennas 901 (FIG. 9) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 901 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: generate a first subset of a plurality of fields, wherein the first subset may be mandatory in a probe request frame; generate a second subset of the plurality of fields, wherein the second subset may be optional in the probe request frame regardless of capability information of the device; generate the probe request frame comprising the first subset and the second subset; and cause to send the probe request frame to an access point (AP) device.

Example 2 may include the device of example 1 and/or some other example herein, wherein the first subset may be comprised of only a service set identifier (SSID) element.

Example 3 may include the device of example 1 and/or some other example herein, wherein the second subset may be comprised of, a request element, an extended request element, a fast initial link setup (FILS) request parameter element, a short SSID list element, one or more vendor specific elements, a probe request variant multiple links (ML) element, and a known BSSID element.

Example 4 may include the device of example 1 and/or some other example herein, wherein the device may be a first STA that may be affiliated with a non-AP multi-link device (MLD).

Example 5 may include the device of example 4 and/or some other example herein, wherein the processing circuitry may be further configured to: maintain an MLD address of the non-AP MLD; and randomize a medium access control (MAC) address of the first STA of the non-AP MLD.

Example 6 may include the device of example 4 and/or some other example herein, wherein the processing circuitry may be further configured to: send a frame to an associated AP MLD, wherein the frame comprises an updated MAC address of the first STA; and receive a response frame from the associated AP MLD confirming the updated MAC address of the first STA.

Example 7 may include the device of example 6 and/or some other example herein, wherein the updated MAC address of the first STA may be updated based on a predetermined pattern for a predetermined period between the non-AP MLD and the associated AP MLD.

Example 8 may include the device of example 4 and/or some other example herein, wherein the processing circuitry may be further configure to have the first STA of the non-AP MLD set a TXVECTOR parameter SCRAMBLER_RESET to RESET_SCRAMBLER on a next transmitted physical layer (PHY) protocol data unit (PPDU).

Example 9 may include the device of example 6 and/or some other example herein, wherein the processing circuitry may be further configured to receive a frame from the associated AP MLD to change an assigned association identifier (AID) of the non-AP MLD.

Example 10 may include the device of example 4 and/or some other example herein, wherein the processing circuitry may be further configured to receive a random offset for a sequence number (SN); and add a random offset modular the maximum size of a sequence number space to all recipient record of the non-AP MLD that uses the SN number.

Example 11 may include the device of example 4 and/or some other example herein, wherein the processing circuitry may be further configured to perform message filtering on incoming frames based on a receiving station address (RA) and on a transmitting station address (TA), wherein the RA matches a MAC address of a first STA of the non-AP MLD, and wherein the TA matches the MAC address of a first AP of an associated AP MLD.

Example 12 may include a non-transitory computer-readable medium storing computer-executable instructions which when executed by one or more processors result in performing operations comprising: generating a first subset of a plurality of fields, wherein the first subset may be mandatory in a probe request frame; generating a second subset of the plurality of fields, wherein the second subset may be optional in the probe request frame regardless of capability information of the device; generating the probe request frame comprising the first subset and the second subset; and causing to send the probe request frame to an access point (AP) device.

Example 13 may include the non-transitory computer-readable medium of example 12 and/or some other example herein, wherein the first subset may be comprised of only a service set identifier (SSID) element.

Example 14 may include the non-transitory computer-readable medium of example 12 and/or some other example herein, wherein the second subset may be comprised of, a request element, an extended request element, a fast initial link setup (FILS) request parameter element, a short SSID list element, one or more vendor specific elements, a probe request variant multiple links (ML) element, and a known BSSID element.

Example 15 may include the non-transitory computer-readable medium of example 12 and/or some other example herein, wherein the device may be a first STA that may be affiliated with a non-AP multi-link device (MLD).

Example 16 may include the non-transitory computer-readable medium of example 15 and/or some other example herein, wherein the operations further comprise: maintaining an MLD address of the non-AP MLD; and randomizing a medium access control (MAC) address of the first STA of the non-AP MLD.

Example 17 may include the non-transitory computer-readable medium of example 15 and/or some other example herein, wherein the operations further comprise: sending a frame to an associated AP MLD, wherein the frame comprises an updated MAC address of the first STA; and receiving a response frame from the associated AP MLD confirming the updated MAC address of the first STA.

Example 18 may include the non-transitory computer-readable medium of example 17 and/or some other example herein, wherein the updated MAC address of the first STA may be updated based on a predetermined pattern for a predetermined period between the non-AP MLD and the associated AP MLD.

Example 19 may include the non-transitory computer-readable medium of example 15 and/or some other example herein, wherein the processing circuitry may be further configure to have the first STA of the non-AP MLD set a TXVECTOR parameter SCRAMBLER_RESET to RESET_SCRAMBLER on a next transmitted physical layer (PHY) protocol data unit (PPDU).

Example 20 may include the non-transitory computer-readable medium of example 17 and/or some other example herein, wherein the operations further comprise receiving a frame from the associated AP MLD to change an assigned association identifier (AID) of the non-AP MLD.

Example 21 may include the non-transitory computer-readable medium of example 15 and/or some other example herein, wherein the operations further comprise
receiving a random offset for a sequence number (SN); and adding a random offset modular the maximum size of a sequence number space to all recipient record of the non-AP MLD that uses the SN number.

Example 22 may include the non-transitory computer-readable medium of example 15 and/or some other example herein, wherein the operations further comprise performing message filtering on incoming frames based on a receiving station address (RA) and on a transmitting station address (TA), wherein the RA matches a MAC address of a first STA of the non-AP MLD, and wherein the TA matches the MAC address of a first AP of an associated AP MLD.

Example 23 may include a method comprising: generating, by one or more processors, a first subset of a plurality of fields, wherein the first subset may be mandatory in a probe request frame; generating a second subset of the plurality of fields, wherein the second subset may be optional in the probe request frame regardless of capability information of the device; generating the probe request frame comprising the first subset and the second subset; and causing to send the probe request frame to an access point (AP) device.

Example 24 may include the method of example 23 and/or some other example herein, wherein the first subset may be comprised of only a service set identifier (SSID) element.

Example 25 may include the method of example 23 and/or some other example herein, wherein the second subset may be comprised of, a request element, an extended request element, a fast initial link setup (FILS) request parameter element, a short SSID list element, one or more vendor specific elements, a probe request variant multiple links (ML) element, and a known BSSID element.

Example 26 may include the method of example 23 and/or some other example herein, wherein the device may be a first STA that may be affiliated with a non-AP multi-link device (MLD).

Example 27 may include the method of example 26 and/or some other example herein, further comprising: maintaining an MLD address of the non-AP MLD; and randomizing a medium access control (MAC) address of the first STA of the non-AP MLD.

Example 28 may include the method of example 26 and/or some other example herein, further comprising: sending a frame to an associated AP MLD, wherein the frame comprises an updated MAC address of the first STA; and receiving a response frame from the associated AP MLD confirming the updated MAC address of the first STA.

Example 29 may include the method of example 28 and/or some other example herein, wherein the updated MAC address of the first STA may be updated based on a predetermined pattern for a predetermined period between the non-AP MLD and the associated AP MLD.

Example 30 may include the method of example 26 and/or some other example herein, wherein the processing circuitry may be further configure to have the first STA of the non-AP MLD set a TXVECTOR parameter SCRAMBLER_RESET to RESET_SCRAMBLER on a next transmitted physical layer (PHY) protocol data unit (PPDU).

Example 31 may include the method of example 28 and/or some other example herein, further comprising receiving a frame from the associated AP MLD to change an assigned association identifier (AID) of the non-AP MLD.

Example 32 may include the method of example 26 and/or some other example herein, further comprising
receiving a random offset for a sequence number (SN); and adding a random offset modular the maximum size of a sequence number space to all recipient record of the non-AP MLD that uses the SN number.

Example 33 may include the method of example 26 and/or some other example herein, further comprising performing message filtering on incoming frames based on a receiving station address (RA) and on a transmitting station address (TA), wherein the RA matches a MAC address of a first STA of the non-AP MLD, and wherein the TA matches the MAC address of a first AP of an associated AP MLD.

Example 34 may include an apparatus comprising means for: generating a first subset of a plurality of fields, wherein the first subset may be mandatory in a probe request frame; generating a second subset of the plurality of fields, wherein the second subset may be optional in the probe request frame regardless of capability information of the device; generating the probe request frame comprising the first subset and the second subset; and causing to send the probe request frame to an access point (AP) device.

Example 35 may include the apparatus of example 35 and/or some other example herein, wherein the first subset may be comprised of only a service set identifier (SSID) element.

Example 36 may include the apparatus of example 35 and/or some other example herein, wherein the second subset may be comprised of, a request element, an extended request element, a fast initial link setup (FILS) request parameter element, a short SSID list element, one or more vendor specific elements, a probe request variant multiple links (ML) element, and a known BSSID element.

Example 37 may include the apparatus of example 35 and/or some other example herein, wherein the device may be a first STA that may be affiliated with a non-AP multi-link device (MLD).

Example 38 may include the apparatus of example 37 and/or some other example herein, further comprising: maintaining an MLD address of the non-AP MLD; and randomizing a medium access control (MAC) address of the first STA of the non-AP MLD.

Example 39 may include the apparatus of example 37 and/or some other example herein, further comprising: sending a frame to an associated AP MLD, wherein the frame comprises an updated MAC address of the first STA; and receiving a response frame from the associated AP MLD confirming the updated MAC address of the first STA.

Example 40 may include the apparatus of example 39 and/or some other example herein, wherein the updated MAC address of the first STA may be updated based on a predetermined pattern for a predetermined period between the non-AP MLD and the associated AP MLD.

Example 41 may include the apparatus of example 37 and/or some other example herein, wherein the processing circuitry may be further configure to have the first STA of the non-AP MLD set a TXVECTOR parameter SCRAMBLER_RESET to RESET_SCRAMBLER on a next transmitted physical layer (PHY) protocol data unit (PPDU).

Example 42 may include the apparatus of example 39 and/or some other example herein, further comprising receiving a frame from the associated AP MLD to change an assigned association identifier (AID) of the non-AP MLD.

Example 43 may include the apparatus of example 37 and/or some other example herein, further comprising
receiving a random offset for a sequence number (SN); and adding a random offset modular the maximum size of a sequence number space to all recipient record of the non-AP MLD that uses the SN number.

Example 44 may include the apparatus of example 37 and/or some other example herein, further comprising performing message filtering on incoming frames based on a receiving station address (RA) and on a transmitting station address (TA), wherein the RA matches a MAC address of a first STA of the non-AP MLD, and wherein the TA matches the MAC address of a first AP of an associated AP MLD.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:

generate a first subset of a plurality of fields, wherein the first subset is mandatory in a probe request frame;
generate a second subset of the plurality of fields, wherein the second subset is optional in the probe request frame regardless of capability information of the device, wherein the second subset is comprised of, a request element, an extended request element, a fast initial link setup (FILS) request parameter element, a short SSID list element, one or more vendor specific elements, a probe request variant multiple links (ML) element, and a known BSSID element;
generate the probe request frame comprising the first subset and the second subset; and
cause to send the probe request frame to an access point (AP) device.

2. The device of claim 1, wherein the first subset is comprised of only a service set identifier (SSID) element.

3. The device of claim 1, wherein the device is a first STA that is affiliated with a non-AP multi-link device (MLD).

4. The device of claim 3, wherein the processing circuitry is further configured to:
maintain an MLD address of the non-AP MLD; and
randomize a medium access control (MAC) address of the first STA of the non-AP MLD.

5. The device of claim 3, wherein the processing circuitry is further configured to:
send a frame to an associated AP MLD, wherein the frame comprises an updated MAC address of the first STA; and
receive a response frame from the associated AP MLD confirming the updated MAC address of the first STA.

6. The device of claim 5, wherein the updated MAC address of the first STA is updated based on a predetermined pattern for a predetermined period between the non-AP MLD and the associated AP MLD.

7. The device of claim 5, wherein the processing circuitry is further configured to receive a frame from the associated AP MLD to change an assigned association identifier (AID) of the non-AP MLD.

8. The device of claim 3, wherein the processing circuitry is further configured to have the first STA of the non-AP MLD set a TXVECTOR parameter SCRAMBLER_RESET to RESET_SCRAMBLER on a next transmitted physical layer (PHY) protocol data unit (PPDU).

9. The device of claim 3, wherein the processing circuitry is further configured to receive a random offset for a sequence number (SN); and
add a random offset modular having a maximum size of a sequence number space to all recipient record of the non-AP MLD that uses the SN number.

10. The device of claim 3, wherein the processing circuitry is further configured to perform message filtering on incoming frames based on a receiving station address (RA) and on a transmitting station address (TA), wherein the RA matches a MAC address of a first STA of the non-AP MLD, and wherein the TA matches the MAC address of a first AP of an associated AP MLD.

11. A non-transitory computer-readable medium storing computer-executable instructions which when executed by one or more processors result in performing operations comprising:
generating a first subset of a plurality of fields, wherein the first subset is mandatory in a probe request frame;
generating a second subset of the plurality of fields, wherein the second subset is optional in the probe request frame regardless of capability information of a device, wherein the second subset is comprised of, a request element, an extended request element, a fast initial link setup (FILS) request parameter element, a short SSID list element, one or more vendor specific elements, a probe request variant multiple links (ML) element, and a known BSSID element;
generating the probe request frame comprising the first subset and the second subset; and
causing to send the probe request frame to an access point (AP) device.

12. The non-transitory computer-readable medium of claim 11, wherein the first subset is comprised of only a service set identifier (SSID) element.

13. The non-transitory computer-readable medium of claim 11, wherein the device is a first STA that is affiliated with a non-AP multi-link device (MLD).

14. The non-transitory computer-readable medium of claim 13, wherein the operations further comprise:
maintaining an MLD address of the non-AP MLD; and
randomizing a medium access control (MAC) address of the first STA of the non-AP MLD.

15. The non-transitory computer-readable medium of claim 13, wherein the operations further comprise:
sending a frame to an associated AP MLD, wherein the frame comprises an updated MAC address of the first STA; and
receiving a response frame from the associated AP MLD confirming the updated MAC address of the first STA.

16. The non-transitory computer-readable medium of claim 15, wherein the updated MAC address of the first STA is updated based on a predetermined pattern for a predetermined period between the non-AP MLD and the associated AP MLD.

17. The non-transitory computer-readable medium of claim 13, wherein the operations further comprise: to have the first STA of the non-AP MLD set a TXVECTOR parameter SCRAMBLER_RESET to RESET_SCRAMBLER on a next transmitted physical layer (PHY) protocol data unit (PPDU).

18. A method comprising:
generating, by one or more processors, a first subset of a plurality of fields, wherein the first subset is mandatory in a probe request frame;
generating a second subset of the plurality of fields, wherein the second subset is optional in the probe request frame regardless of capability information of a device, wherein the second subset is comprised of, a request element, an extended request element, a fast initial link setup (FILS) request parameter element, a short SSID list element, one or more vendor specific elements, a probe request variant multiple links (ML) element, and a known BSSID element;
generating the probe request frame comprising the first subset and the second subset; and
causing to send the probe request frame to an access point (AP) device.

* * * * *